US008738101B1

(12) United States Patent
Myr

(10) Patent No.: US 8,738,101 B1
(45) Date of Patent: May 27, 2014

(54) SMARTPHONE-TABLET HYBRID DEVICE

(71) Applicant: David Myr, Jerusalem (IL)

(72) Inventor: David Myr, Jerusalem (IL)

(73) Assignee: Makor Issues and Rights Ltd., Jerusalem (IL)

( * ) Notice: Subject to any disclaimer, the term of this patent is extended or adjusted under 35 U.S.C. 154(b) by 0 days.

(21) Appl. No.: 13/793,572

(22) Filed: Mar. 11, 2013

Related U.S. Application Data

(60) Provisional application No. 61/761,502, filed on Feb. 6, 2013.

(51) Int. Cl.
*H04M 1/00* (2006.01)

(52) U.S. Cl.
USPC ............. 455/575.1; 455/575.3; 455/90.3; 455/566; 379/330

(58) Field of Classification Search
USPC ........... 455/575.1, 575.3, 90.3, 566, 158.4, 455/414.1, 557, 346, 575.7, 128; 379/330, 379/428.01; 235/441, 439
See application file for complete search history.

(56) References Cited

U.S. PATENT DOCUMENTS

| | | | |
|---|---|---|---|
| 8,132,037 B2* | 3/2012 | Fehr et al. ..................... | 713/500 |
| 2009/0021214 A1 | 1/2009 | Foster et al. | |
| 2009/0307517 A1* | 12/2009 | Fehr et al. ..................... | 713/500 |
| 2010/0045241 A1 | 2/2010 | Nousiainen | |
| 2011/0001687 A1 | 1/2011 | Srinivasan et al. | |
| 2011/0007465 A1 | 1/2011 | Naito | |
| 2011/0143769 A1 | 6/2011 | Jones et al. | |
| 2011/0256905 A1* | 10/2011 | Ryan ........................... | 455/556.1 |
| 2012/0188726 A1 | 7/2012 | Nonaka et al. | |
| 2012/0223872 A1 | 9/2012 | Ram | |
| 2012/0270528 A1* | 10/2012 | Goodman ..................... | 455/418 |
| 2012/0305648 A1* | 12/2012 | Sondhi et al. ................. | 235/441 |
| 2013/0077228 A1* | 3/2013 | Batio ........................ | 361/679.29 |
| 2013/0278499 A1* | 10/2013 | Anderson ..................... | 345/156 |
| 2013/0285855 A1* | 10/2013 | Dupray et al. ................ | 342/451 |

OTHER PUBLICATIONS http://techcrunch.com/2011/08/15/photovoltaic-cells-in-lcds-could-recycle-wasted-and-ambient-light/ downloaded Jul. 29, 2013.
http://www.portablesolarpower.biz/products/6-watt-portable-solar-usb-mobile-phone-charger downloaded Aug. 13, 2013.
http://www.bosch-solarenergy.it/bosch-solar-app-to-go/ downloaded Aug. 13, 2013.
http://www.Ig.com/uk/mobile-phones/Ig-P920-optimus-3d downloaded Aug. 13, 2013.

\* cited by examiner

*Primary Examiner* — Minh D Dao
(74) *Attorney, Agent, or Firm* — Gerry J. Elman; Elman Technology Law, P.C.

(57) ABSTRACT

The present invention discloses a multi-state detachable smartphone-tablet hybrid mobile device comprising a number of display parts connected to each other. By opening one or some of the displays, more screen space becomes available, and the smartphone is therefore converted and expanded to the tablet device. With folding the displays back, the device becomes a smartphone again. The display parts connected with the special design hinge mechanism enabling opening of up to 360 degrees due to the special hinge mechanism. The invention further includes a detachable display parts feature, transforming the device to a number of single-display smartphone devices.
The device may further comprise a number of photovoltaic cells covering sufficient portion of each display part. Such a large number of photovoltaic cells will aim to produce enough energy to make it a completely self-charging device.

11 Claims, 19 Drawing Sheets

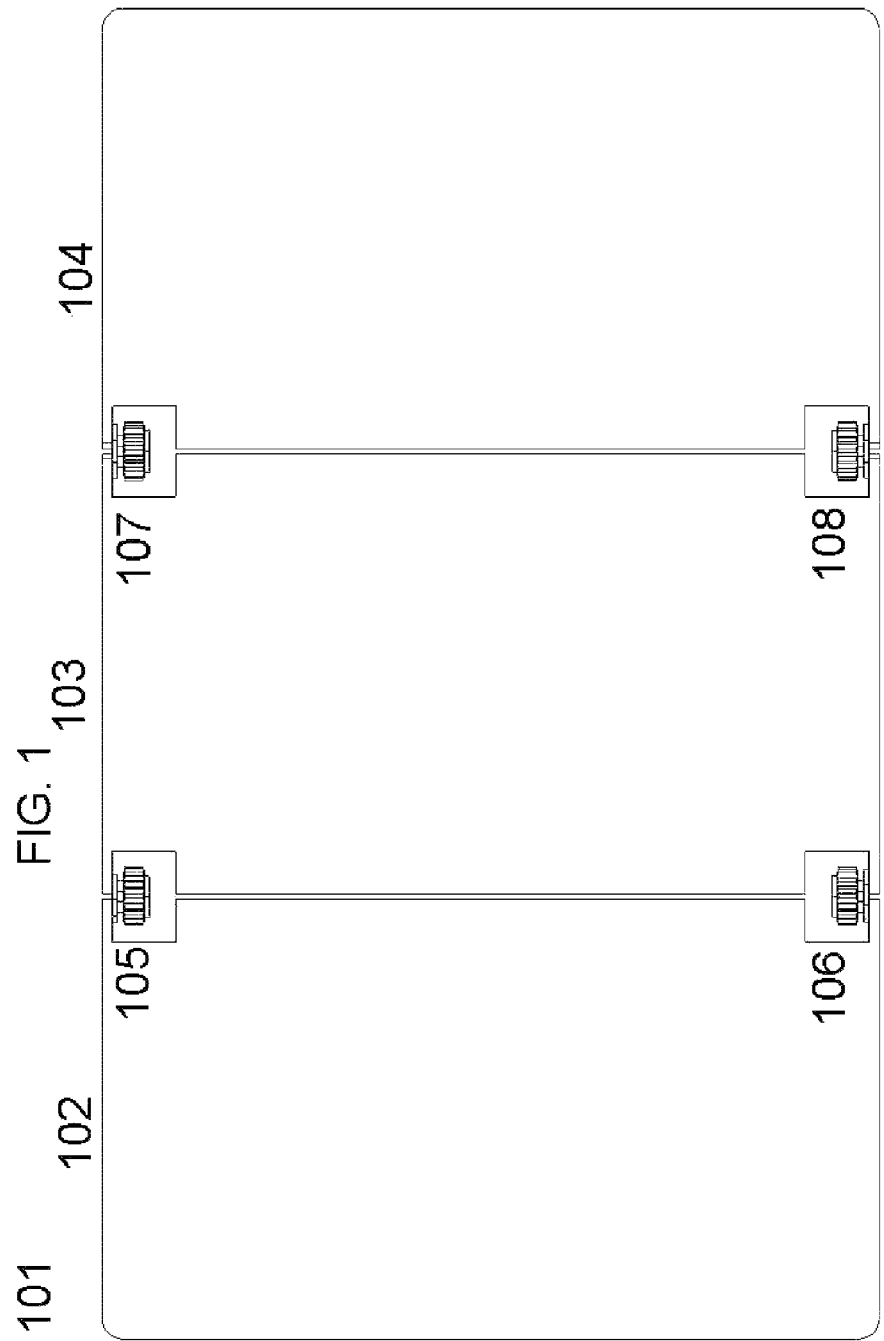

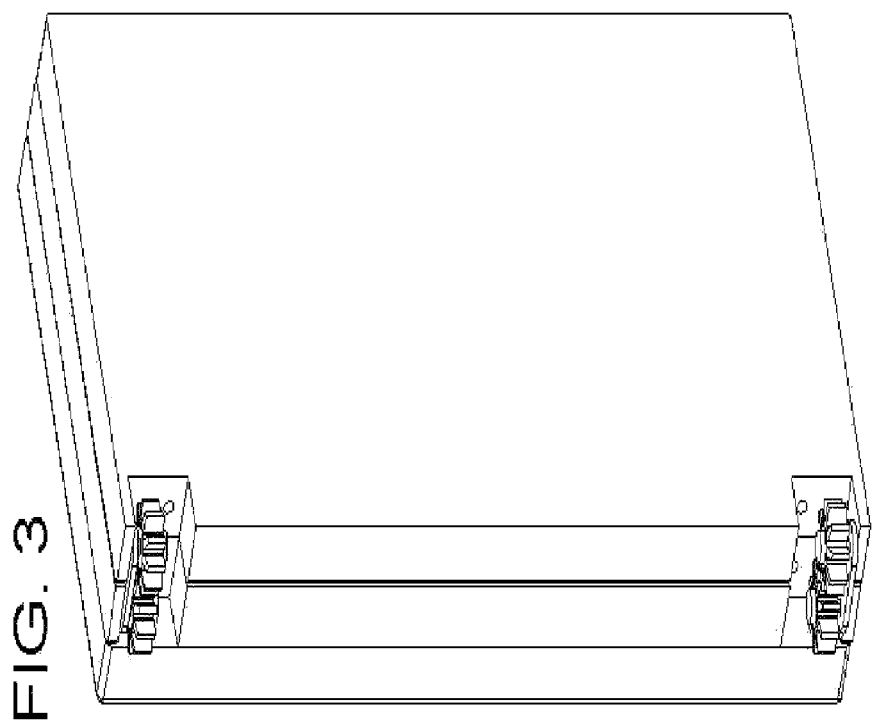

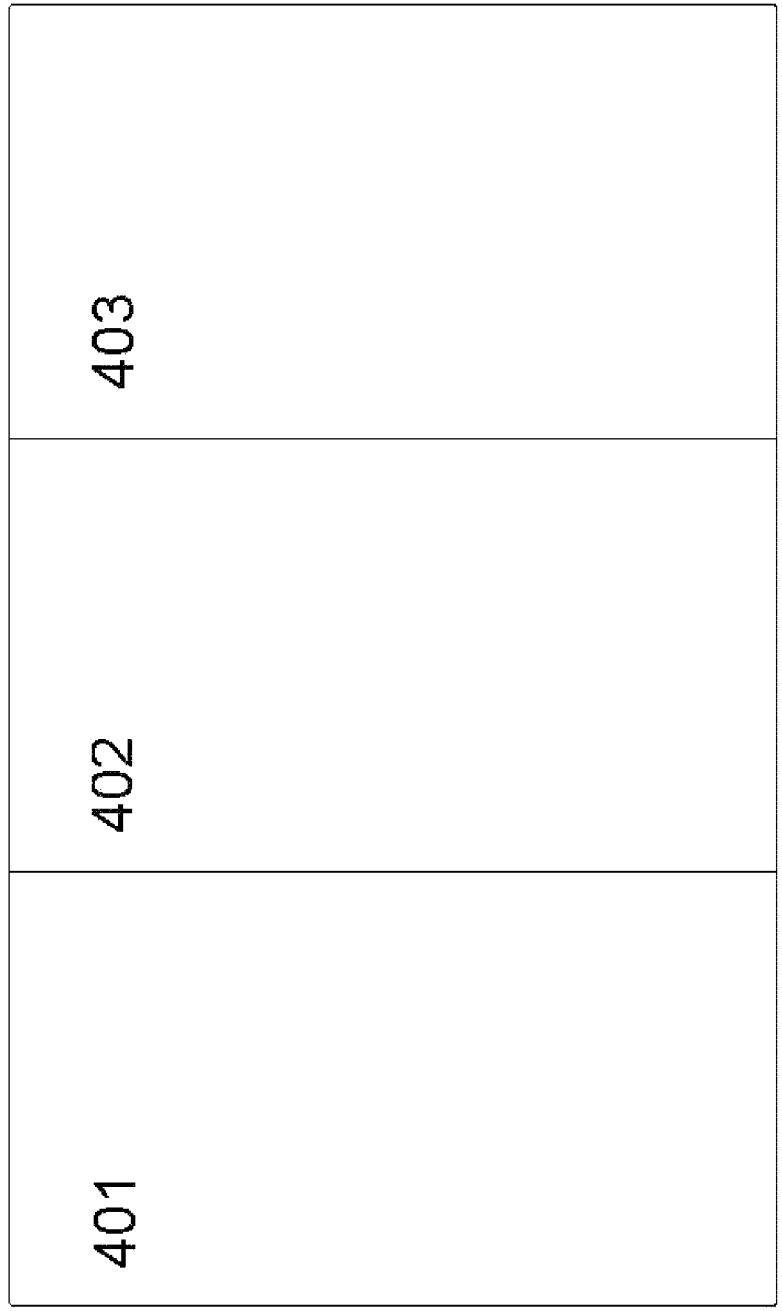

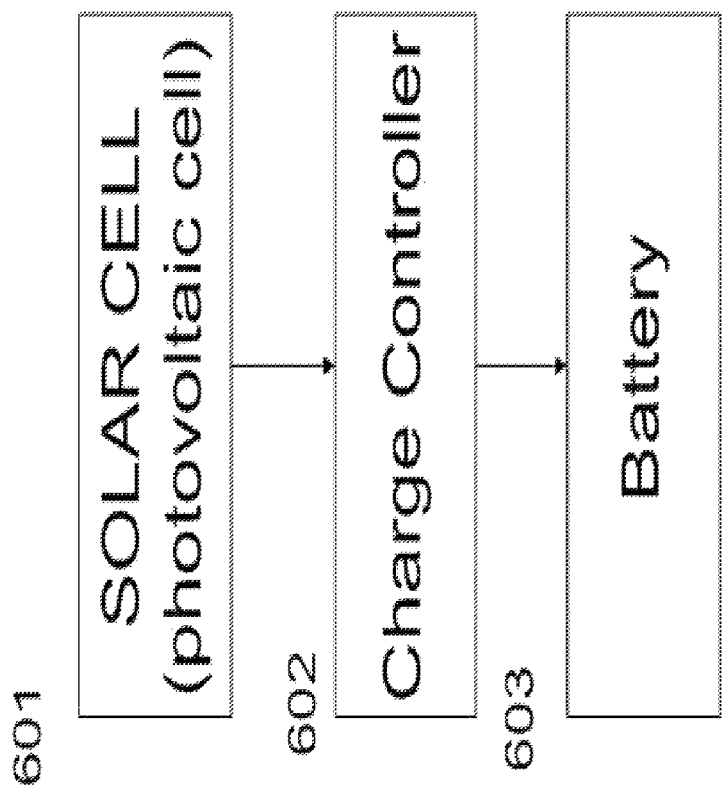

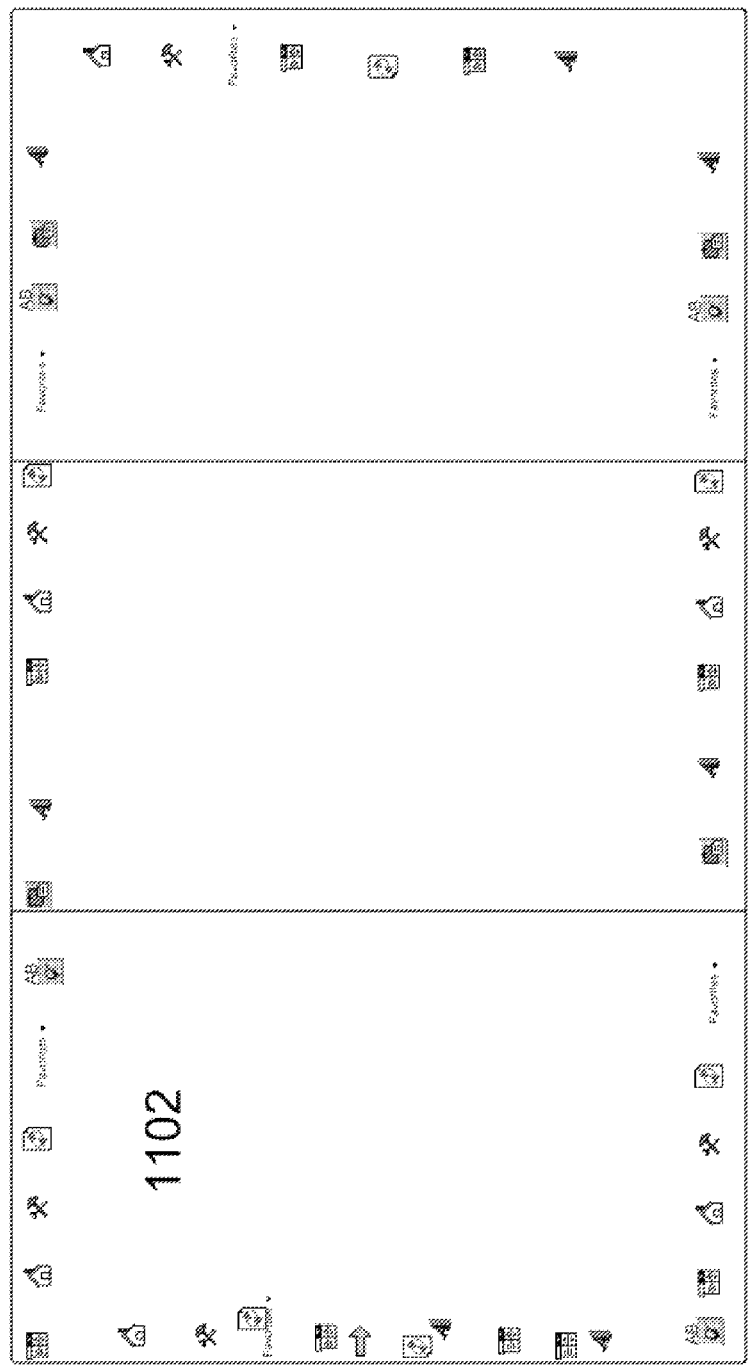

SMARTPHONE-TABLET HYBRID DEVICE

CROSS-REFERENCE TO RELATED APPLICATION

This patent application claims benefit from U.S. Provisional Patent Application 61/761,502 filed Feb. 6, 2013.

FIELD OF THE INVENTION

A novel smartphone-tablet-based hybrid device, and in particular, a self-charging, detachable, open-close multi-display type device.

BACKGROUND OF THE INVENTION AND THE STATE OF THE ART

Smartphones, tablets and other compact electronic devices are extremely widespread and people are increasingly relying upon these devices for a choice of purposes. Cellular phone market is huge and the potential is great especially in a smartphone segment of the market. Worldwide sales of mobile phones to end users reached 419 million units in the second quarter of 2012, according to Gartner, Inc. report when smartphone sales accounted for 36.7 percent of total mobile phone sales and grew 42.7 percent in the second quarter of 2012, according to that report. Vendors shipped 153.9 million smartphones in 2012 compared to 108.3 million units in 2011. According to the International Data Corporation (IDC) Worldwide Quarterly Mobile Phone Tracker, vendors will ship a total of nearly 1.8 billion mobile phones in 2012, compared to 1.7 billion units shipped in 2011. By the end of 2016, IDC forecasts 2.3 billion mobile phones will be shipped to the channel with 12.7% year-over-year annual growth from 2012 till 2016. In terms of the tablet market, IDC has revised their forecast for the worldwide tablet market, suggesting that global shipments are projected to reach 107.4 million units this year, 137.4 million in 2013, and 222.1 million by 2016.

In recent years, smartphones have been used in more and more situations, and along with this, information to be displayed on a display has become various. Therefore, the size of a screen of the display has been increased. However, since the size of the screen of the display is limited by the size of the display, there is a limitation in a number of smartphone uses. This makes it rather difficult to enjoy surfing the net, watching TV, playing an online video game or viewing some sort of multimedia presentation.

As a result there is a strong need for a multi-display device solution to meet the needs of today's advanced mobile uses.

There are a number of multi-screen devices currently announced to the market.

China Union Branch has announced the development of a smartphone-tablet combo very similar to the ASUS Padfone. The TransPhone is a device that has a flat panel display with a dock for a smartphone on its back side.

Echo phone by Kyocera provides a dual-screen phone with Android OS, wherein a pair of displays are coupled to each other, such that both the displays are provided with respective image display surfaces, thereby enabling both the image display surfaces to offer larger amounts of information to users.

U.S. Patent Application Publication 2011/0007465 by Naito of Kyocera discloses a dual-screen device that includes a first display and a second display connected so that they can move relative to each other.

U.S. Patent Application Publication 2012/0188726 by Nonaka of Kyocera discloses a portable electronic apparatus includes coupled first and second displays with respective image display surfaces. Similar devices were also disclosed by Jones in U.S. Patent Application 20110143769 and in U.S. Patent Application 20110001687 by Srinivasan.

Unlike the abovementioned prior art, the present invention provides a detachable device with three displays in the preferred embodiment of the invention with an angle of opening of up to 360 degrees.

U.S. Patent Application Publication 2012/0223872 titled: "Multiple Monitor Display Apparatus" by Ram discloses a multiple monitor apparatus in the form of a laptop PC, a desktop monitor, a mobile device, or the like. In dual-screen mode, the user sits centered between the two monitors. In single-screen mode, the additional display enclosure(s) are retracted and stored in such a manner that they do not present themselves to the user. A guiderail assembly is used to center both display enclosures relative to the user.

Samsung reportedly has filed a U.S. Patent Application for a folding cell phone with flexible AMOLED display, using the YOUM-type AMOLED display. Samsung's display does not consist of any glass, and it is comprised of TFT film layer, an Encap film layer, and a polarizer. The Samsung flexible display technology is different from our invented technology. It also has a number of disadvantages, since only part of the Samsung device could be flexible since there are a number of hard parts that must be in every cell phone device.

With respect to the detachable aspect of the present invention, there are a number of currently available detachable devices, such as the Lenovo IdeaPad U1 Hybrid that features a detachable screen, enabling the device to switch between laptop and tablet PC modes. There are no detachable multi-screen devices with three or more display parts enabling the device to switch between smartphone and tablet states. PadFone 2 from Asus presents a detachable device, when detaching is performed while docking the phone into or pulling it out of the PadFone Station.

With regard to the self-charging aspect of the invention, U.S. Patent Application Publication 2010/0045241 by Nousiainen of Nokia discloses a self-charging cellphone battery, called Piezoelectric Kinetic Energy Harvester. It discloses a battery that's mounted in a larger frame and isolated from it by piezoelectric elements. Thus, kinetic energy generated by movement is used to produce electricity to "at least partially recharge the device battery."

U.S. Patent Application Publication 2009/0021214 by Foster titled: "Portable electronic device carrier with charging system" discloses a charger for a portable electronic device comprising a carrier and a charging system, the charging system comprising photovoltaic cells configured to convert light into electricity and a battery configured to be charged by electricity generated by the photovoltaic cell(s).

A new development from the UCLA Materials Science department presents a phone LCD display that is made of two polarized transparent sheets which sandwich the liquid crystal molecules that form pixels. Only a small part of the back light goes through the pixels and over 75 percent of the light energy gets absorbed in the polarizing sheets. The researchers led by Professor Yang Yang employ an organic photovoltaic polarizer that would convert the light from the back light into electricity to charge the phone battery. See also http://techcrunch.com/2011/08/15/photovoltaic-cells-in-lcds-could-recycle-wasted-and-ambient-light/

Bosch Solar Energy produces Solar To Go solution currently suited for Apple iPad that could be downloaded from the Apple's AppStore.

The "Pocket Panel" is a portable solar charger from PortableSolarPower company. It is a Portable Solar USB Charging Panel designed to charge cell phones and other USB devices via their USB port.

Despite the recent developments, there is no device that is completely self-chargeable. Due to the fact that in the invention, the photovoltaic cells will cover up to the entire area of every display element, self-charging becomes more realistic.

With regards to the 3D camera aspect of the invention, Nokia produced a tablet with a 3D camera at the back. The tablet device relies on a dual photo/video sensor. LG Optimus 3D P920 presents another example of a smartphone equipped with dual cameras and 3D Camera features to allow to shoot 3D movies and snap 3D photos via dual cameras—see http://www.lg.com/uk/mobile-phones/lg-P920-optimus-3d. Fujitsu recently presented a 3D adaptor device that uses a series of mirrors to split the field of vision of your phone's camera in two, creating the same sort of stereo separation that's accomplished by a pair of image sensors in proper 3D cameras.

BRIEF DESCRIPTION OF THE DRAWINGS

FIG. 1 is a diagrammatic front view of the general appearance of a device of the present invention comprising three display parts.

FIG. 3 is a perspective view of the device of FIG. 1 in the folded, smartphone, or closed configuration.

FIG. 4 is a diagrammatic front view of the device of FIG. 1 in the unfolded, tablet configuration.

FIG. 11b shows an example of a control bar of FIG. 11a as displayed in its "stretched" state, spanning three display parts.

DETAILED DESCRIPTION

Figure 2A:
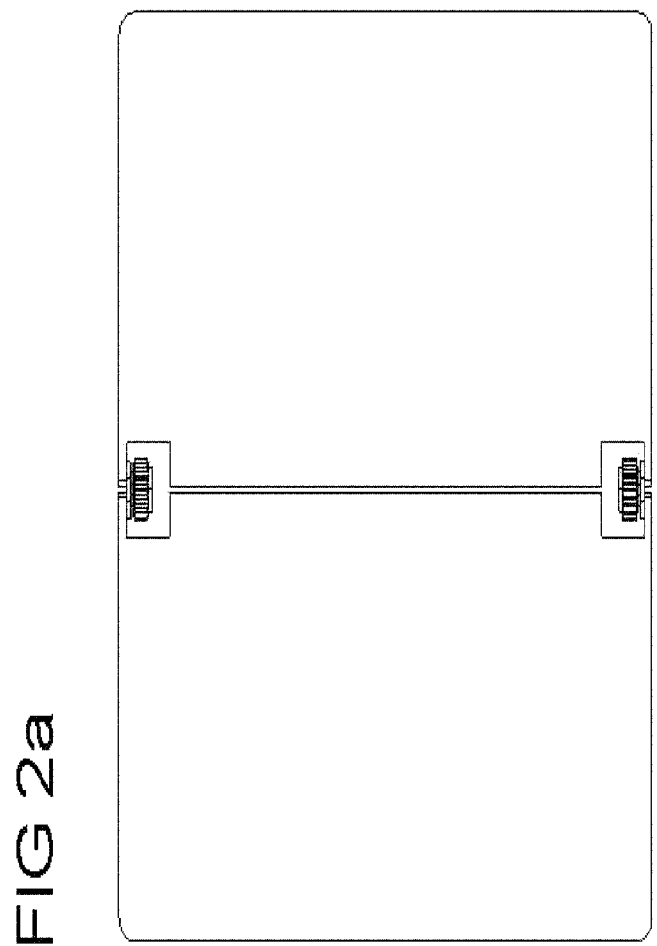
FIG. 2a is a diagrammatic front view of the general appearance of a device of the present invention comprising two display parts.

The present invention will now be described more fully hereinafter with reference to the accompanying drawings, in which preferred embodiments of the invention are shown. The invention may, however, be embodied in other different forms and should not be construed as limited to the embodiments set forth herein; rather these embodiments are provided so that the disclosure will be thorough and complete, and will fully convey the scope of the invention to those skilled in the art. More particularly, the disclosed device and its features may be implemented in different types of software and hardware.

In order to overcome the shortcomings of the prior art, this invention provides a multi-state, detachable, open-close type, electronic mobile hybrid smartphone-tablet device. Preferably it is openable with an angle of opening of up to about 360 degrees between any adjacent pair of display parts.

The invented device comprises a plurality of display parts, usable in different configurations: a folded, smartphone configuration where the display parts are overlaid on each other; a semi-open, or tilt, configuration, where the display parts have been moved by hinged rotation from the smartphone configuration; and a tablet configuration wherein the display parts have been opened to an essentially coplanar orientation.

In certain embodiments, some or all of the display parts are detachable from the others.

In a preferred embodiment of the invention, the device comprises three display parts which are coupled to each other, wherein the first and second and the second and third display parts are coupled to each other by a special hinge mechanism. In another embodiments of the invention, the device comprises two display parts or four or more display parts.

In a preferred embodiment of the invention, the invented device has the capability of assuming three configurations and two states:

a folded closed, or smartphone, configuration wherein an image display surface in the first display part abuts and is covered by a rear surface of the second display part, the image display surface in the second display part abuts and is covered by a rear surface of the third display part, and the image display surface in the third display part is exposed;

a tablet configuration where the second and the third display parts have been moved from the closed configuration so that the image display surfaces in all the display parts are exposed in essentially the same plane, in the said tablet state the displays have been moved by 180 degrees from the smartphone state, in the said tablet state where the image display surfaces in all display parts are essentially coplanar with each other, and the device becomes configured as a tablet device;

a tilt configuration where the second and third display parts have been moved from the tablet configuration so that the image display surfaces in adjacent display parts are inclined at an angle of opening of less than 360 degrees and other than 180 degrees.

In each of the aforesaid configurations, the display parts are attached by junctions, one to the next, and thus are said to be in an attached state. The junctions of some embodiments of the inventive device are provided with disengaging means comprising hinges and couplings adapted for detachment and reattachment as desired by the user. These embodiments permit the device to be transformed from a multi-screen device to a number of independent single-screen smartphone devices by using the disengaging means pertinent to each junction. Multiple screens, also known as multi-monitor or multi-display, is a feature supported by special graphics drivers that allow the user to output the device's display to more than one display at the same time. On the hardware side, a special multi-screen driver must be installed to facilitate the multi-screen capabilities and to set multi-screen configuration. There are a number of multi-screen drivers currently well known in the art. Such drivers being currently produced by Nvidia, Intel and a number of other manufacturers.

FIG. 1 presents a general overview of the invented device's appearance in a preferred embodiment of the invention, wherein the device comprises three display parts which are connected to each other, all the display parts being provided with respective image display surfaces.

An electronic mobile device 101 according to this preferred embodiment of the invention includes a first display part 102, a second display part 103, and a third display part 104 linked to each other by connecting junctions formed by hinge mechanisms 105, 106, 107, 108. The hinges are cogwheel shaped and enabling the 360 degrees opening of the device. Cogged wheel may have any number of cogs and notches. All the display parts therefore can be opened and closed with respect to the other display parts by use of the special designed hinge mechanisms. Hinges 105 and 106 link right end of the first display part 102 and left end of the second display part 103. Hinges 107 and 108 link left end of the second display part 103 and right end of the third display part 104. The display parts are configured to be capable of being opened and closed about a rotation axis of the hinge portion with respect to the other display parts. The hinge generally includes two opposing cogged wheel couplers, each having a semicircular part with a number of cogs meshed to the cogs of the opposite coupler's semicircular part and a number of notches in each of the cogged wheels. The connection of the couplers may be performed by conventional means to include screws, pins, rivets or press fit. A special hinge design allows all display parts to open with an angle of up to 360 degrees. The invention further includes tilt locking means adapted to softly lock the coupling connector at this rotational angle, say of 180 degrees, such soft locking means well known in the art. Specifically, the tilt lock assembly comprises lock member, lock engagement member and means for engaging and disengaging the lock engagement member. Cogged wheel may be rotated by dislocating it from the tilt locking means.

FIG. 2a presents a general overview of the invented device appearance wherein the invented device comprises two display parts.

Figure 2B:
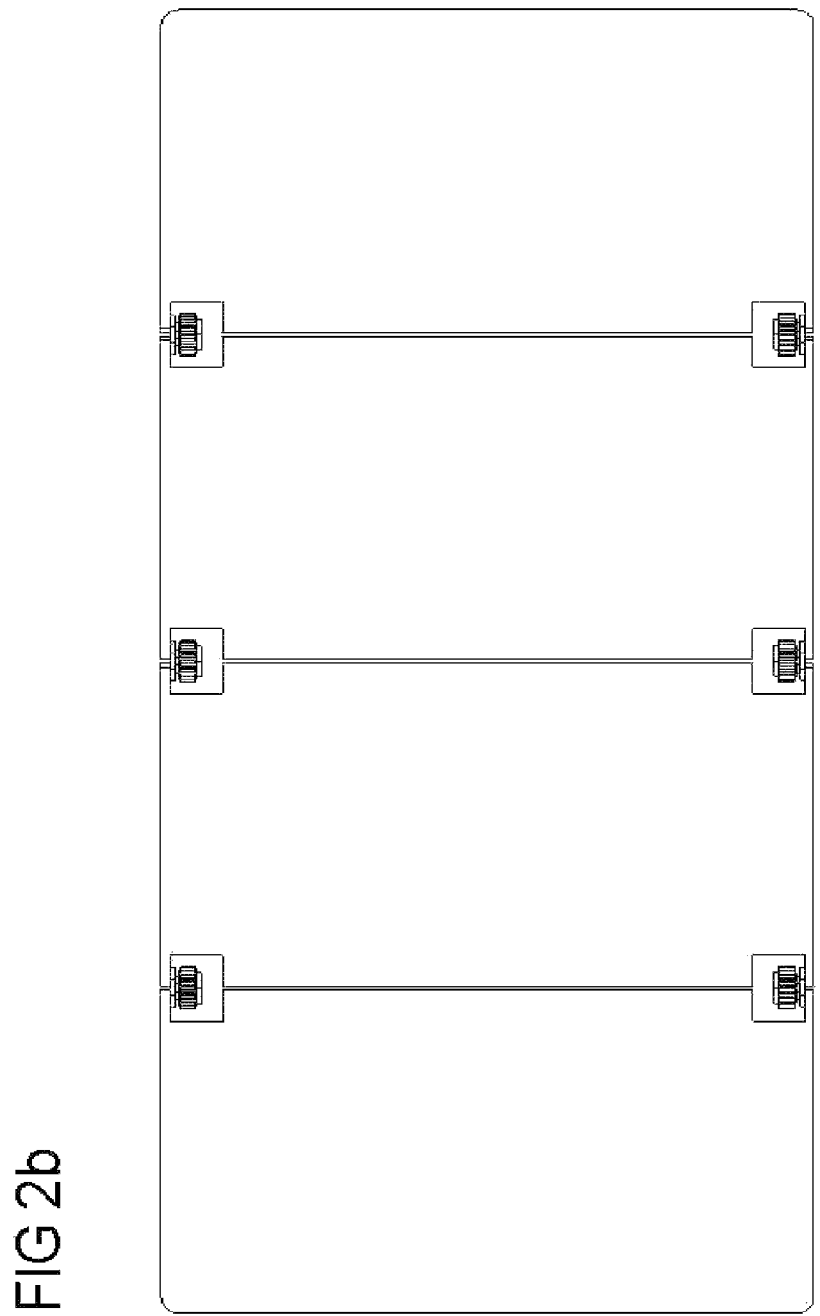
FIG. 2b is a diagrammatic front view of the general appearance of a device of the present invention comprising four display parts.

FIG. 2b presents a general overview of the invented device appearance wherein the invented device comprises four display parts.

From now on, this disclosure will concentrate on embodiments of the invention which comprise three display parts.

FIG. 3 shows the invented device in its smartphone configuration, wherein the display surface of the first display part is covered by a rear surface of the second display part, the display surface of the second display part is covered by a rear surface of the third display part. It is the image display surface of the third display part which is exposed for use.

FIG. 4 graphically presents the invented device in a tablet configuration where front image display surfaces of all three display parts 401, 402, 403 are arranged on the same plane to be exposed for use. The junctions between adjacent display parts thus have an angle of 180 degrees.

Figure 5:
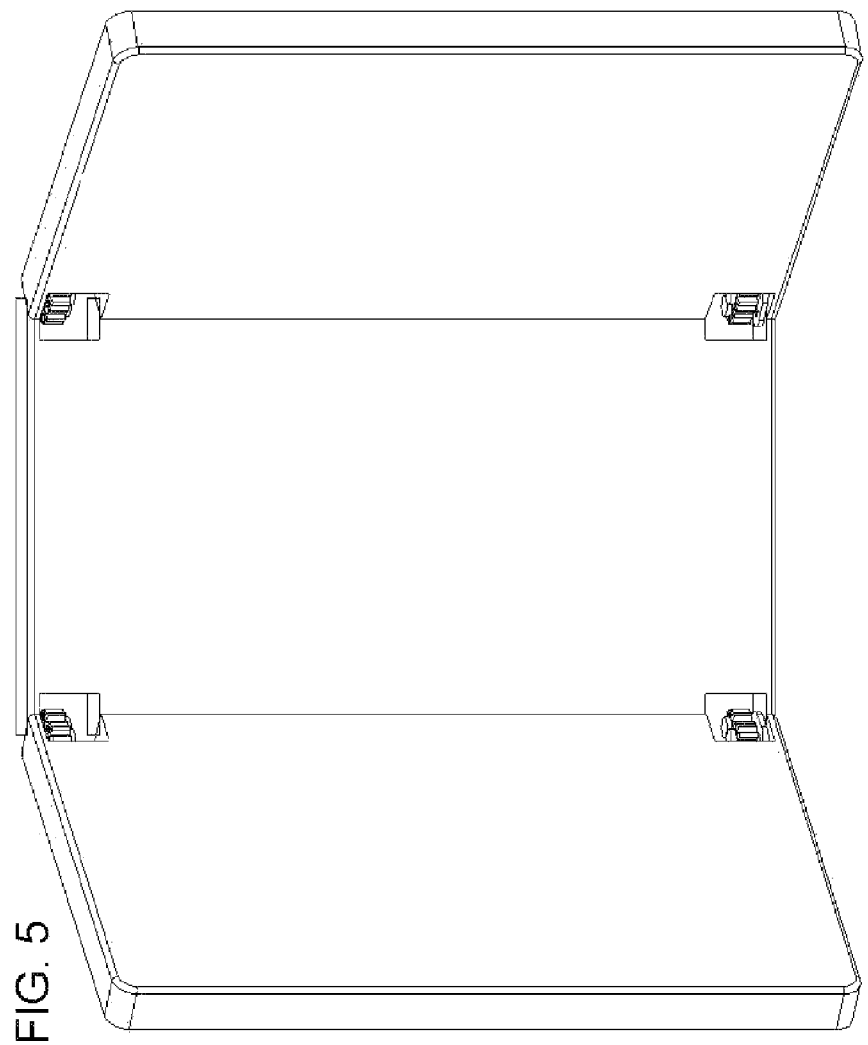
FIG. 5 is a perspective view of the device of FIG. 1 in a semi-open configuration.

The invented device could also be presented in a semi-open tilt state where the display parts have been rotated on their hinges from the smartphone state so that the image display surfaces of all the display parts are exposed and, also, the image display surfaces in all or some of the adjacent display parts are inclined at an angle of opening which is up to 180 degrees. A special locking tilt mechanism is provided to stop the opening at an angle of exactly 180 degrees, such stopper mechanism is well known in the art. FIG. 5 illustrates the invented device in a semi-open tilt state. The said tilt lock mechanism is activated when the device is at any tilt position, the tilt lock mechanism engaging and locking the device when it moves from the closed state into the tilt or open position.

Another aspect of the invention is the self-charging feature of the invented device. The self-charging feature is especially important since in the multi-screen environment, battery supply will not last for a long time, and charging a battery can become very frequent. The self-charging feature of the invention is beneficial in the emergency situations when the electricity is not readily available to charge the phone battery in the usual way, as well as in developing countries.

Figure 6:
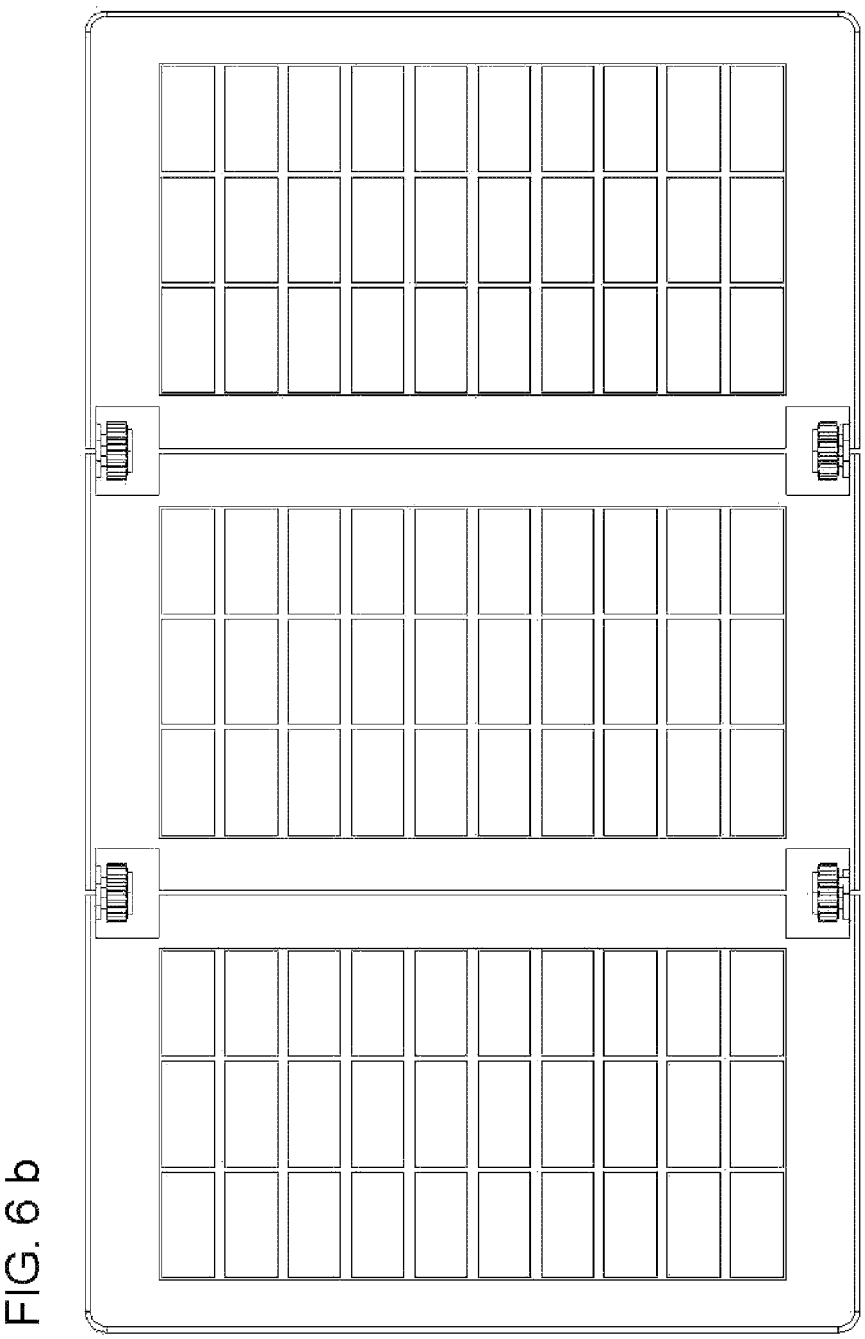
FIG. 6a presents a block diagram of the invented device's photovoltaic feature.
FIG. 6b is a diagrammatic front view of a device of FIG. 1 in the tablet configuration wherein a multiplicity of photovoltaic cells are provided on each of the displays.
Figure 7A:
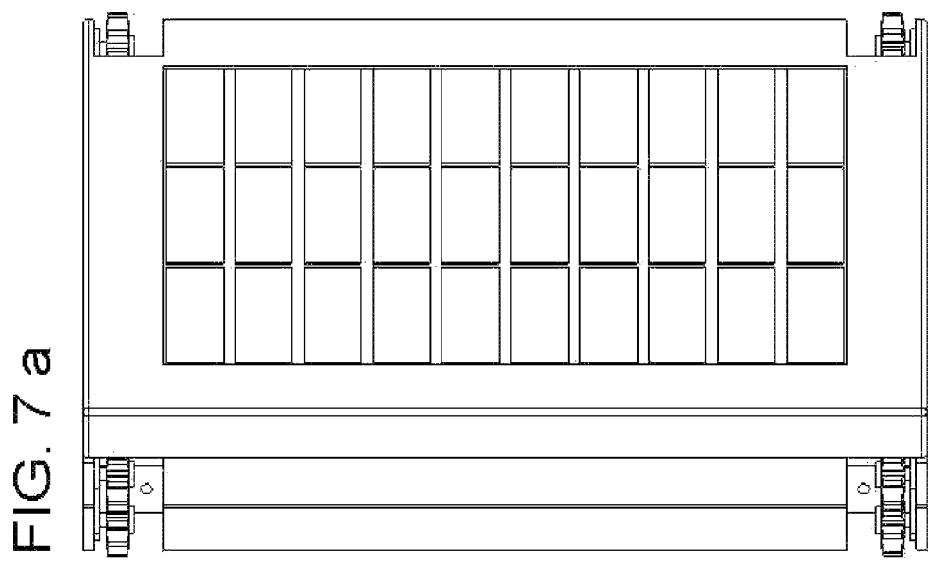
FIG. 7a is a diagrammatic front view of a device of FIG. 6 wherein one display is in the semi-open configuration.
Figure 7B:
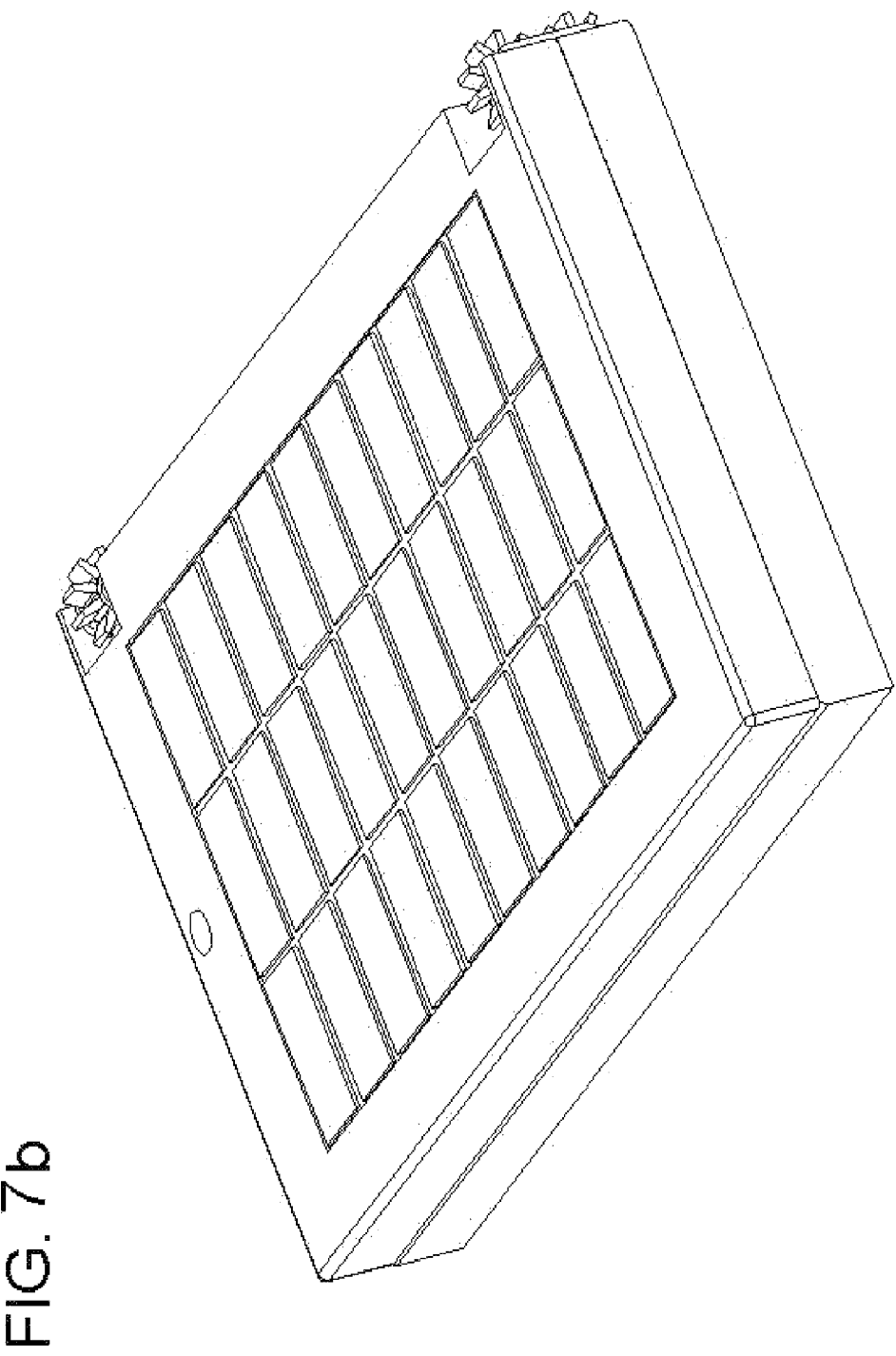
FIG. 7b is a diagrammatic perspective view of a device of FIG. 2a in the smartphone configuration.

The self-charging will be facilitated due to the photovoltaic features. The device will therefore include special charging system, such self-charging system will consist of a number of photovoltaic cells configured to convert light into electricity and a number of batteries (one or more batteries) configured to be charged by the said electricity generated by photovoltaic cells. Each of the display parts will have a number of differently shaped photovoltaic cells on its interior area, thus enabling charging when the display parts are in either open and close positions. FIG. 6a presents an invented device photovoltaic feature block diagram, wherein photovoltaic cells 601 go through charge controller 602 and charge the phone battery 603. FIG. 6b graphically represents the invented device with a number of photovoltaic cells placed on the backside of each of the display parts in its tablet state, while FIG. 7a graphically represents the invented device with a number of photovoltaic cells on each of the display parts wherein one display part is in the semi-open state. FIG. 7b graphically represents the invented device with a number of photovoltaic cells on each of the display parts wherein the device is in the smartphone state comprises two display parts. The photovoltaic cells shape illustrated in the abovementioned figures are for illustrative purposes only, and they can come in any other shape.

Due to the large number of photovoltaic cells, the aim is to produce enough energy to make it a completely self-charging device.

Figure 8:
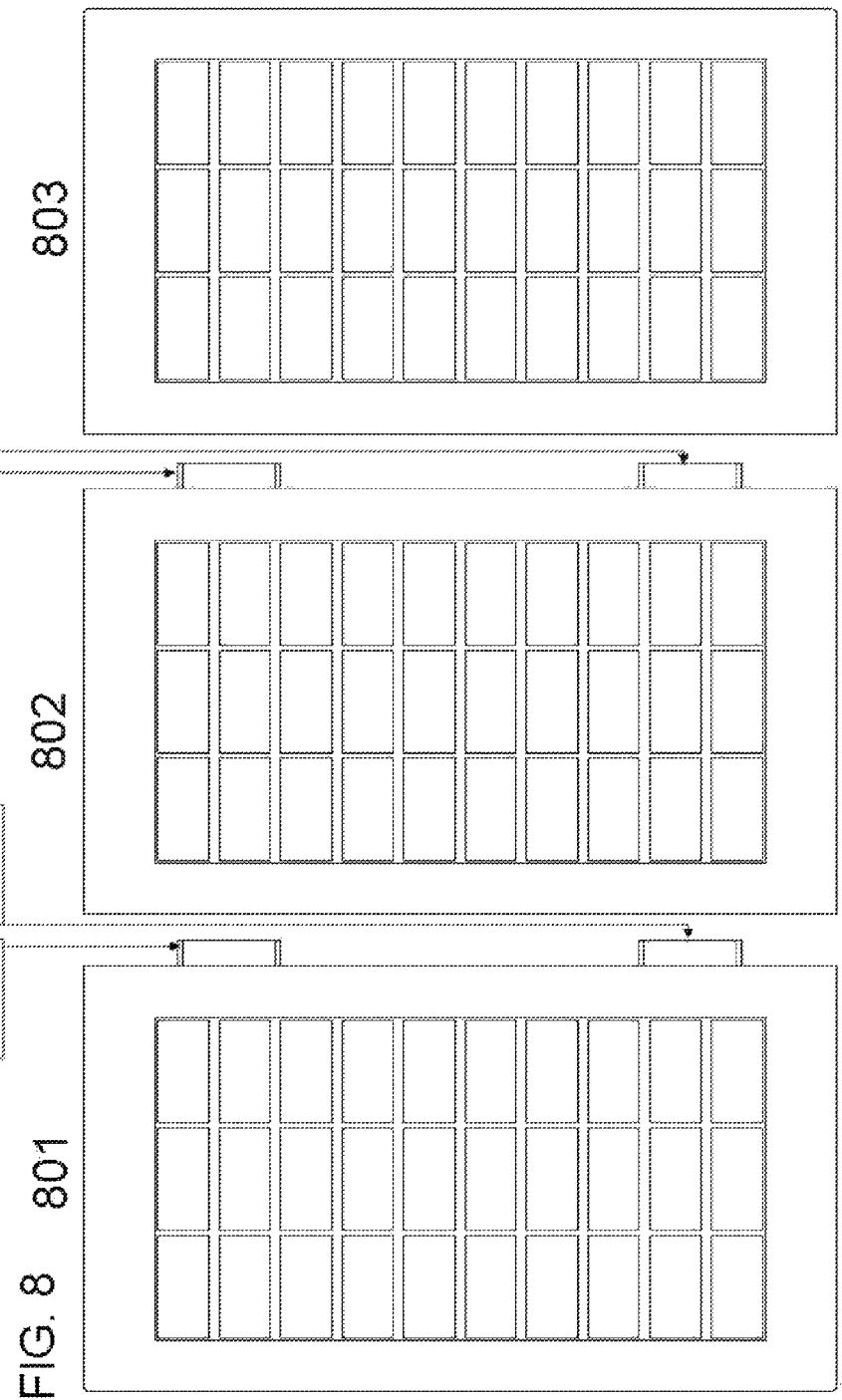
FIG. 8 is a front view of an alternative embodiment of the invention having three display parts, wherein the display parts are detachable, showing the display parts in a detached state.

FIG. 8 depicts the disclosed device as being comprised of display parts which are detachable, in a preferred embodiment of the invention. This figure shows the device in a detached state. Each display part could be detached/reconnected to each other by using connector ports and coupling connectors. Two coupling connectors are provided on the right end portions of the first display part 801: one 804 at the top part of the right end portion, and the second 805 at the bottom part of the right end portion. Similarly, two coupling connectors are provided on the right end portions of the second display 802: one 806 at the top part of the right end portion, and the second 807 at the top part of the right end portion. Each of the coupling connectors is coupled to a corresponding connecting port in the end of the adjacent display part, i.e., coupling connectors 804 and 805 are coupled to the port(s) 808 and 810 at the left side portion of display part 802 and connectors 806 and 807 are coupled to the port(s) 809 and 811 at the left side portion of display part 803. The abovementioned connecting ports and coupling connectors are known in the art. Serial (DB-9) is one example of such connector.

In one embodiment of the invention, the processor, the memory, the operating system and the software of the device could be placed on board of the display part 803, so that display parts 801 and 802 could be detached without limiting most of the device's core features. In another embodiment of the invention, a corresponding processor, memory, operating system, SIM, other hardware and software of the device could be placed in each of the display parts 801, 802, 803, so that each of the display parts becomes one of three independent smartphones and could work independently in the detached state. The invented device will be able to operate on most operating systems, such as Windows 8, iOS, Android, etc. The device will be further equipped with the full Office software suite. The invented device could be especially beneficial in view of the smartphone wallet solutions recently presented. The connection could be done using a variety of connection methods, including Wi-Fi, a connection to the "cloud" environment, etc.

The special drivers and software will be deployed for multi-screen environment. Examples of multi-screen enabling drivers and software (such as the ones manufactured by NVIDIA and Intel) are well known in the art. Multi-screen graphic card should be employed, similarly to the graphic cards in multi-screen computers.

In additional embodiment of the invention, the special cooling mechanism will ne introduced using the latest technological developments. Such a cooler can be connected to the photovoltaic system to prevent battery life shortening The cooler can use the DCJ—Dual Piezoelectric Cooling Jets technology. Using the said technology, GE Company has produced the miniaturized cooler mechanism currently available for the tablets use. GE's has a very small with a complete cooling solution of just 3-4 mm.

Figure 9:
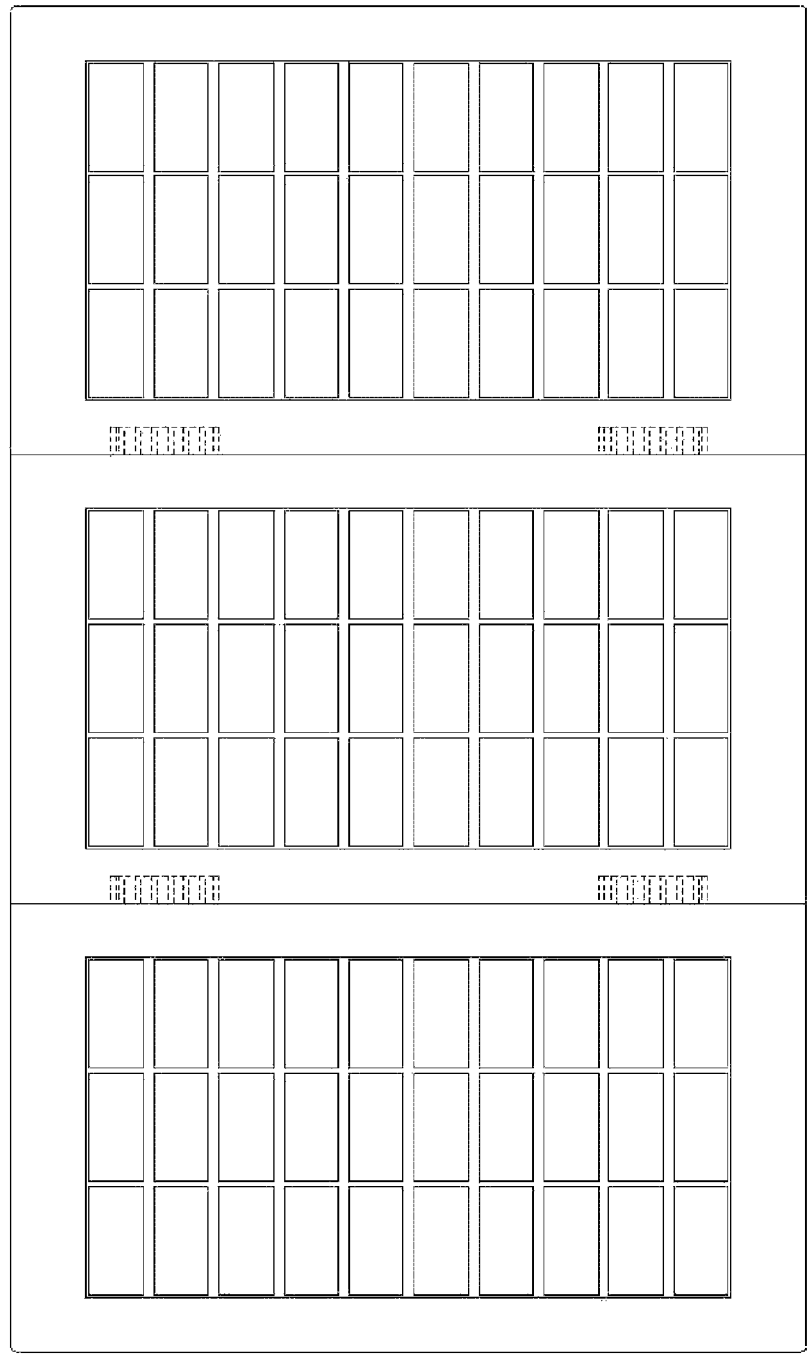
FIG. 9 is a front view of the embodiment of FIG. 8, showing the display parts in the attached state, wherein all the coupling connectors are inserted into all of the connection ports, tablet configuration.

FIG. 9 depicts the disclosed detachable device in its closed state, wherein the all coupling connectors are inserted into all of the connection ports.

Figure 10:
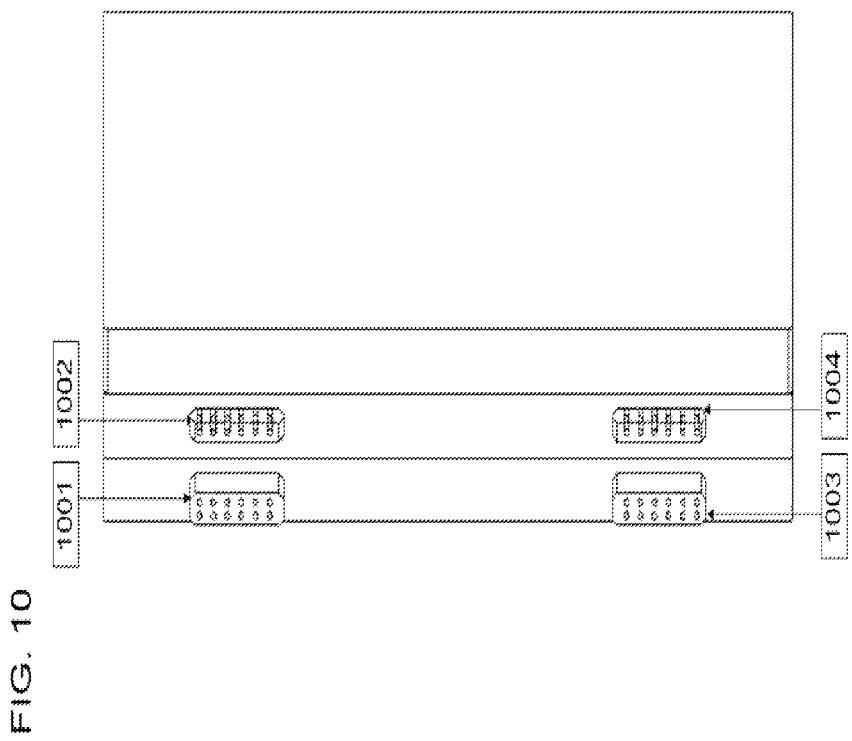
FIG. 10 is a perspective view of the embodiment of FIG. 8 in the attached state of FIG. 9, smartphone configuration.

FIG. 10 depicts the disclosed detachable device in its closed state, wherein the coupling connectors are inserted into the connection/disconnection ports, wherein 1001 and 1003 represent connecting/disconnecting ports while 1002 and 1004 represent coupling connectors.

Figure 11A:
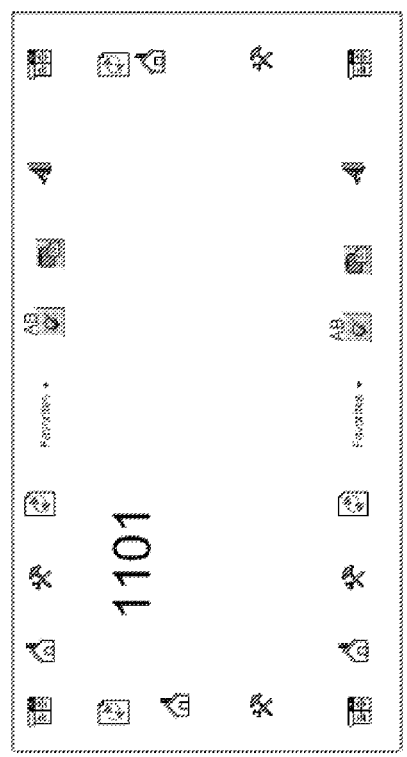
FIG. 11a shows an example of a control bar displayed in its regular state as an image on a single display part.

Turning to FIG. 11a, special software is provided in the device to drive the display to show a control bar (the action bar) of the invented device, which will include various icons or groups of icons. Such an action bar will be situated alongside the entire perimeter (all four sides) of the exposed screen in the folded, or device closed, smartphone configuration, i.e., all four sides of the screen available to be used for displaying useful and customizable icons (FIG. 11a). The abovementioned action bar is "flexible": it has its regular state 1101 depicted in FIG. 11a and a "stretched" state 1102 depicted in FIG. 11b. In the regular state, the separate control bar is situated alongside the perimeter of each of the device's screens 1101, while in the fully open "stretched" state, a single control bar is "stretched" to extend about the perimeter of all of the screens. The device is adapted to sense the device's unfolding into the open "tablet" state and thereupon display the control bar in its stretched state 1102, thereby utilizing the multiple screens of the device in concert.

In that way, the icons are not necessarily presented on the device's "desktop" or other active display area, but rather around the perimeter of the multi-screen device, therefore enabling easy access to them.

Displays from different software applications could be shown on different display parts of the devices in its tablet and semi-open tilt configurations. In accordance with the present invention, a special multi-screen card and software are provided to facilitate that option, as well as other multi-screen capabilities, such multi-screen card and software well known in the art.

Alternatively, if desired, control bar icons may be shown on several separate rows for every screen.

The control bar may be deactivated. The control bar may also be produced as a pane slide, i.e. as a sliding menu. Software to perform such functions is known to those skilled in the art of touchscreen programming.

The multi-SIM feature of the invention enables the device to hold several SIM cards. All of them may be active at the same time. A Subscriber Identity Module is embedded, as customary, into a removable "SIM card." Multi-SIM operation allows the use of two or more services without the need to carry several devices at the same time. In such a way, the same device can be used to allow the user to take advantage of different pricing plans for calls and text messages to certain destinations as well as mobile data usage with several cellular networks operators with separate numbers and bills; or for travel, with an additional SIM for the country visited.

In such a device, there are a number of SIM card slots, any one or more of the SIMs may be active and may be shown on the screen. The user may switch to or activate another SIM by choosing from a menu, which allows the device to be connected to several networks at the same time. The device can switch between several calls, so while the user on a call, he can still still receive calls on the other numbers, such devices are currently known in the art.

One or more cameras may be deployed in each of the display parts of the device to enable the 3D-camera aspect of the invention to allow shooting 3D movies and taking 3D photos via multiple cameras.

The 3D-camera module in certain embodiments of the invention desirably consists of: two or more camera modules, synchronization asic, I2C calibration memory, power supplies, camera and module interfaces. Possible choices for the cameras are: parallel cameras and toe-in cameras, parallel cameras being the preferred alternative. In such embodiments, sensors are placed with their optical axes parallel to each other and pixel rows through the optical centers of the two sensors lying on the same line.

Figure 12:
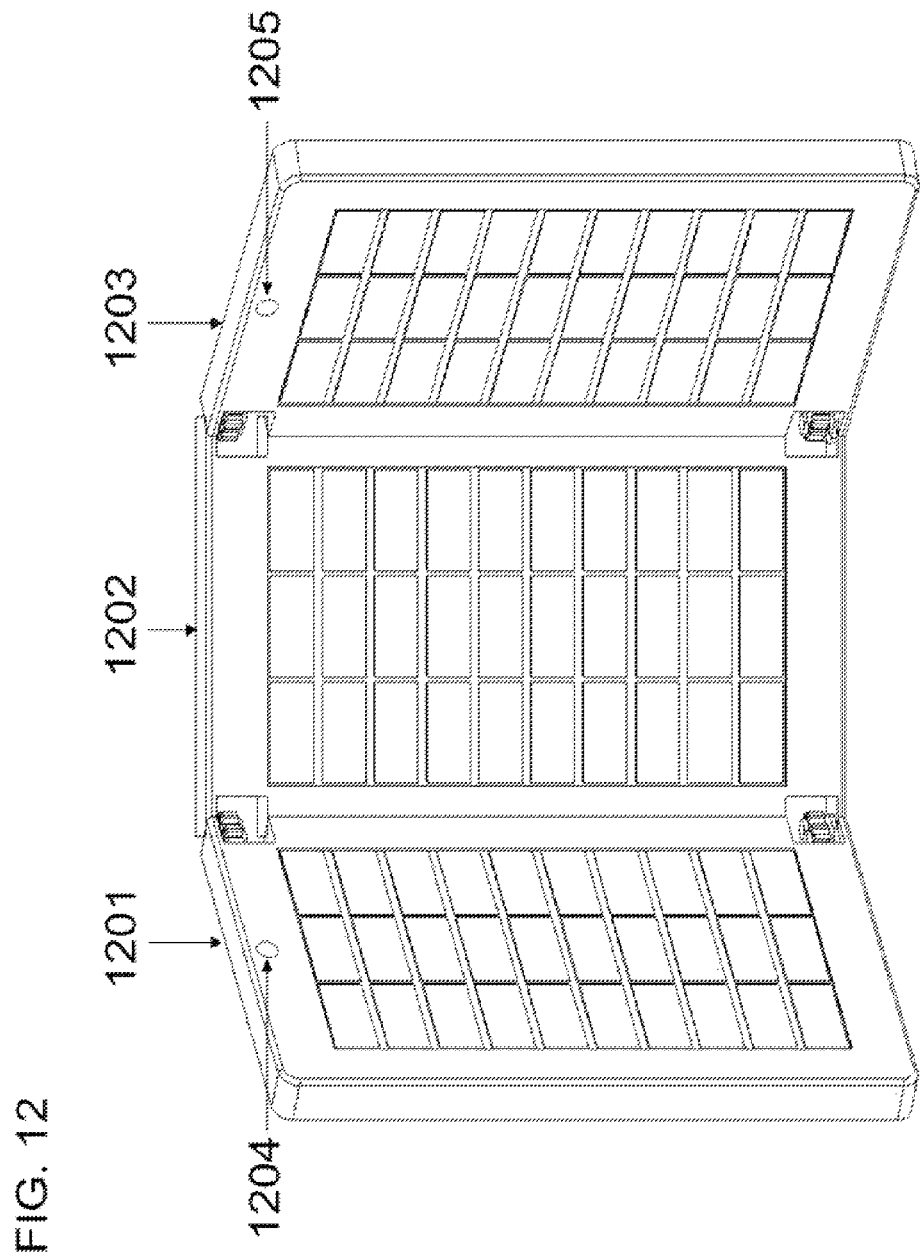
FIG. 12 is a perspective view of an alternative embodiment of the invention having a 3D camera feature, wherein two of the three display parts are equipped with cameras.

FIG. 12 graphically illustrates the invented device having three display parts 1201, 1202 and 1203. Display parts 1201 and 1203, respectively, are equipped with cameras 1204 and 1205, two in total, to facilitate the 3D camera feature.

Figure 13:
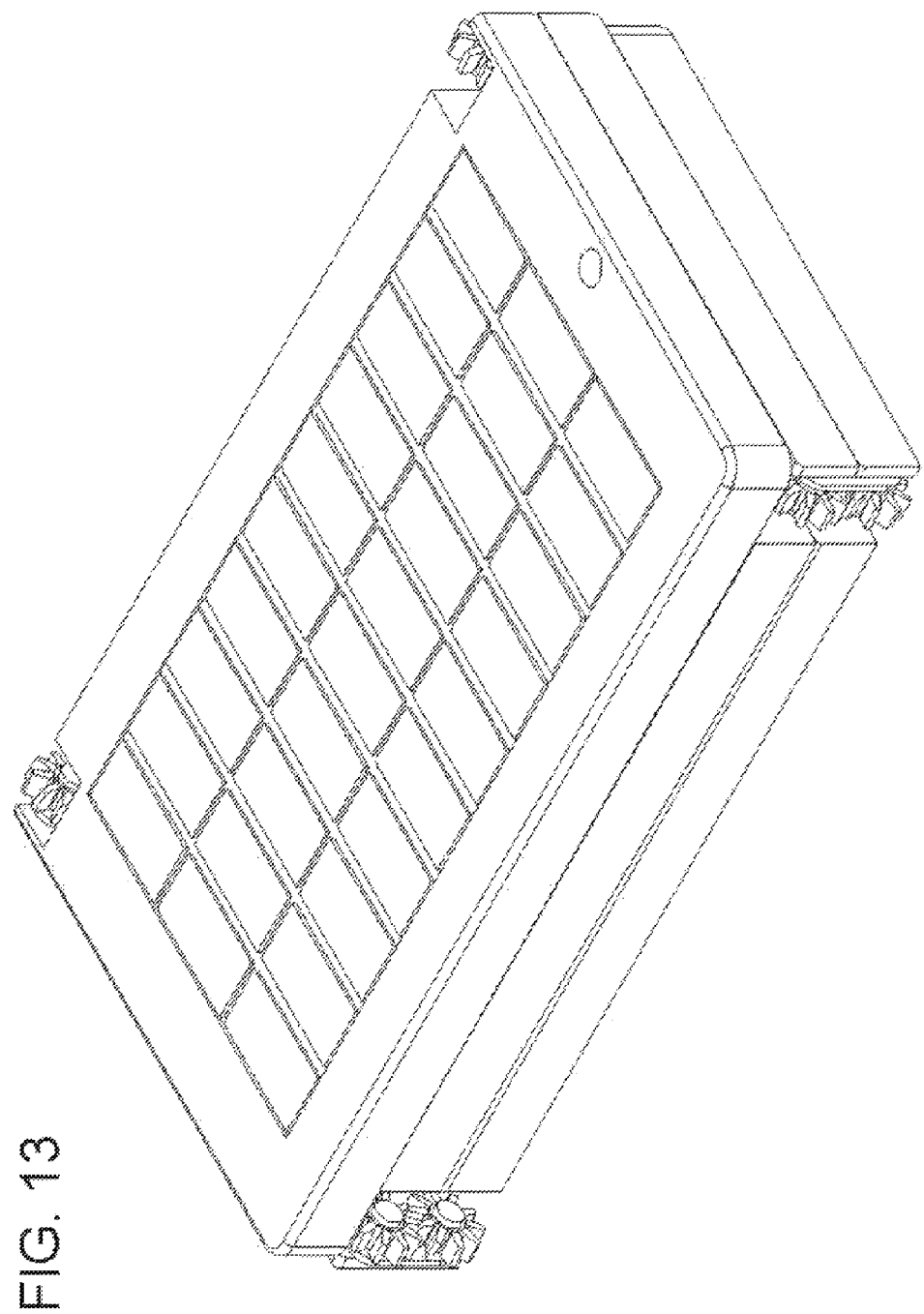
FIG. 13 is a perspective view of the embodiment of FIG. 12, in the folded, smartphone configuration, showing an outward-facing camera.

FIG. 13 graphically illustrates the invented device in its smartphone configuration. When the device is in the smartphone configuration, the camera may be active, and so the device is adapted to take pictures in the folded, smartphone configuration as well as the unfolded, tablet configuration.

Figure 14:
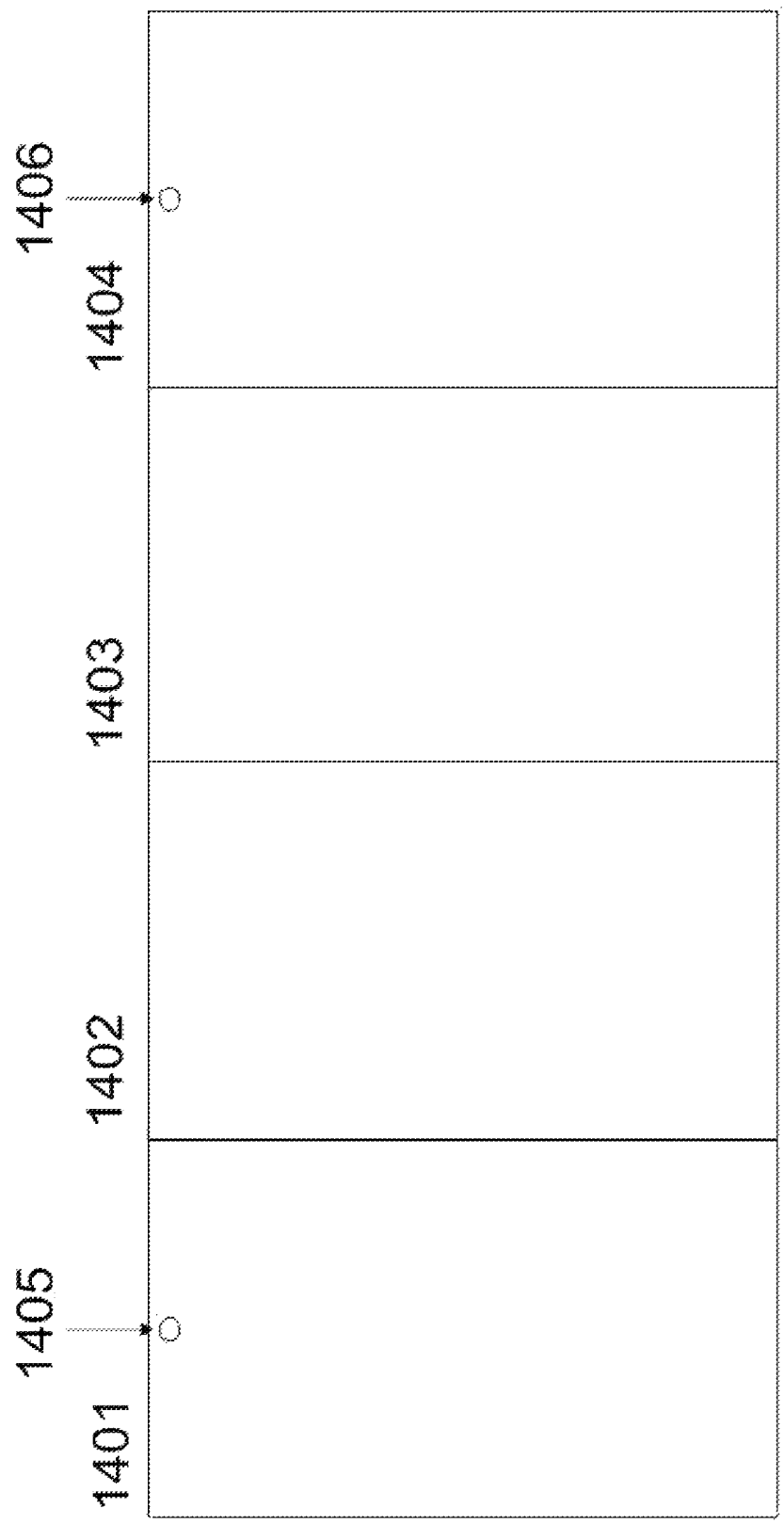
FIG. 14 is a diagrammatic front view of an alternative embodiment of the invention having a 3D camera feature, having four display parts, wherein two of the display parts are equipped with cameras.

FIG. 14 graphically illustrates the invented device wherein there are four display parts 1401, 1402, 1403 and 1404 equipped as shown with two cameras 1405 and 1406 in total, to facilitate the 3D-camera feature. The cameras 1405 and 1406 are situated in the interior portion of the device.

Figure 15:
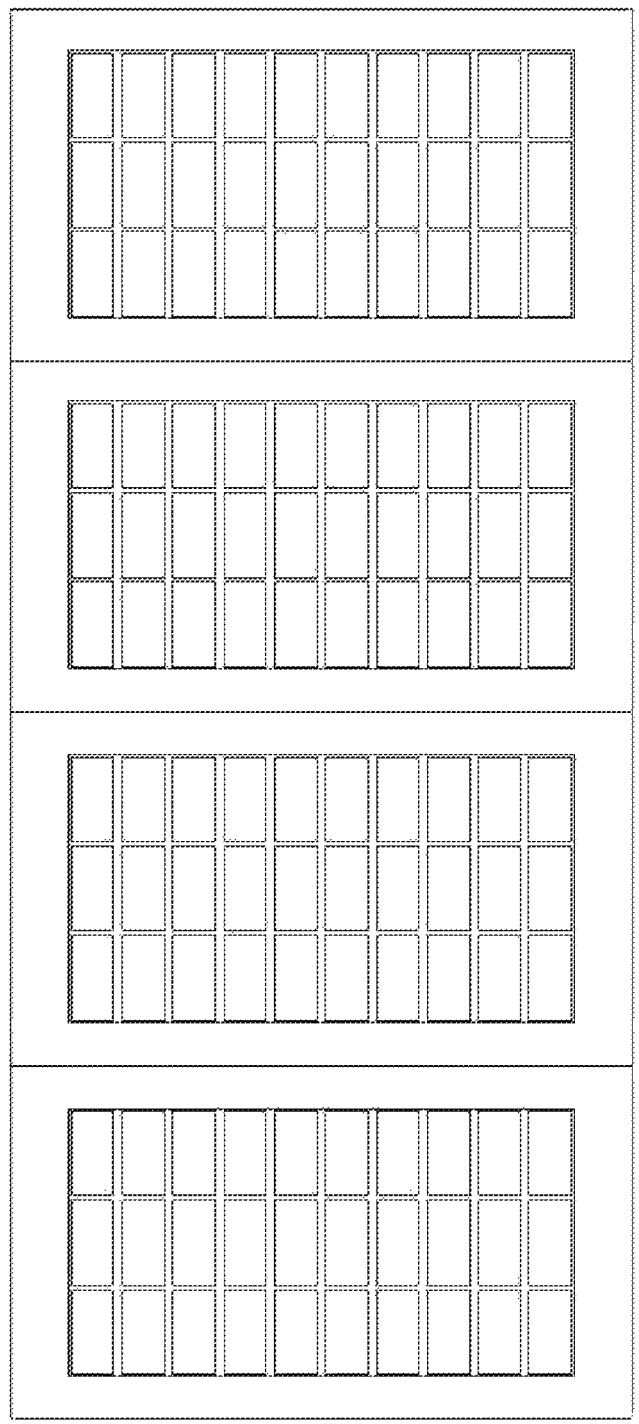
FIG. 15 is a diagrammatic front view of an alternative embodiment of the invention having four display parts equipped with photovoltaic cells.

FIG. 15 diagrammatically represents the invented device wherein all four display parts are equipped with photovoltaic cells.

Further Embodiments of the Invention

In another embodiment of the invention, the device presented is a multi-screen satellite phone. Over the past few years, satellite phone communication has become more common due to lower costs and truly global communications network, with coverage of the entire earth. Accordingly, in that embodiment of the invention, the device connects to orbiting satellites instead of cell sites. The satellite phone feature could be useful in emergency situations, in developing countries, and in places where mobile networks operators' coverage is unsatisfactory.

The architectures, processes, software and hardware presented above are not exclusive. Other software and hardware may also be derived in accordance with the principles of the invention to accomplish the same objectives.

Those skilled in the art may implement modifications to the current design, without departing from the scope of the invention. Further, any of the functions provided by the system may be implemented in hardware, software or a combination of both.

I claim:

1. A multi-state detachable, electronic, mobile hybrid smartphone-tablet touch screen device comprising a number of display parts connected to each other by connecting hinges, the hinges connecting each pair of the display parts and allowing screens to unfold with an angle of up to 360 degrees with respect to the adjacent display part, the hinges including two opposing couplers, each coupler having a semicircular part with a number of cogs meshed to the cogs of the opposite coupler's semicircular part, further comprising disengaging means for disengaging the display parts, wherein a first, a second, and a third display part are connected to each other in such a way that the device can be operated in each of three different configurations and two states:

in an attached state:
a smartphone configuration where the image display surface in the first display part is covered by a rear surface of the second display part, the image display surface in the second display part is covered by a rear surface of the third display part and the image display surface in the third display part is exposed for viewing and operation by a user;
a tablet configuration where the second and the third display parts have been moved from the closed state so that the image display surfaces in all the displays are exposed in essentially the same plane, and the device becomes operable essentially in the same manner as a tablet device;
a tilt configuration where the second and the third display parts have been moved from the smartphone configuration so that the image display surfaces of each of the display parts are inclined from their respective adjacent display parts at an angle of opening of less than 360 degrees;

and in a detached state, wherein the device is transformed from a multi-screen device to a number of independent single screen smartphone devices by using the disengaging means pertinent to each display.

2. The device of claim 1, wherein the number of display parts is four or more.

3. The device of claim 1, wherein the number of display parts is two.

4. The device of claim 1 further including locking means to lock the connecting hinges at an angle between 1 and 360 degrees, when the connecting hinges have rotated to said angle, facilitating the tilt state of the device.

5. The device of claim 1, further including self-charging multi-screen device means, wherein there are a sufficient number of differently shaped photovoltaic cells placed on the surface of each of the device's screens to enable self-charging of the device's battery.

6. The device of claim 1, further including multi-screen control action bar means for displaying a number of icons, the action bar means being disposed over the entire perimeter of the device's screen.

7. The device of claim 1, further having a stretchable action bar means formed to be stretchable from its regular state to its stretched state, wherein in the smartphone state of the device and in the detached state of the device, one stretchable action bar means is situated along side the perimeter of each of the device's screens, and wherein in the tablet state of the device and in the tilt state of the device, one stretchable action bar means is stretched over the perimeter of all screens.

8. The device of claim 1, further including a multi-screen satellite phone means to enable satellite phone communication.

9. The device of claim 1, wherein each screen is equipped with one or more cameras placed to enable taking 3D pictures and 3D video clips.

10. The device of claim 1, wherein the device is a multi-SIM device holding several SIM cards, wherein all of the SIM cards may be active at the same time.

11. The device of claim 1, further including:
a self-charging photovoltaic means, and
an energy-efficient cooling mechanism to cool the device, the cooling mechanism utilizing Dual Piezoelectric Cooling Jets technology, the cooling mechanism being connected to the self-charging photovoltaic means to prevent battery life shortening.

* * * * *